(12) United States Patent
Kawajiri et al.

(10) Patent No.: US 10,109,868 B2
(45) Date of Patent: Oct. 23, 2018

(54) GAS CHANNEL FORMING PLATE FOR FUEL CELL AND FUEL CELL STACK

(71) Applicants: Kousuke Kawajiri, Kariya (JP); Satoshi Futami, Kariya (JP); Yuki Sugino, Kariya (JP); Takamasa Kanie, Toukai (JP); Hiroki Okabe, Okazaki (JP); Kazunori Shibata, Mishima (JP)

(72) Inventors: Kousuke Kawajiri, Kariya (JP); Satoshi Futami, Kariya (JP); Yuki Sugino, Kariya (JP); Takamasa Kanie, Toukai (JP); Hiroki Okabe, Okazaki (JP); Kazunori Shibata, Mishima (JP)

(73) Assignees: Toyota Shatai Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 110 days.

(21) Appl. No.: 15/227,732

(22) Filed: Aug. 3, 2016

(65) Prior Publication Data
US 2017/0054156 A1    Feb. 23, 2017

(30) Foreign Application Priority Data
Aug. 21, 2015    (JP) ................................. 2015-163694

(51) Int. Cl.
*H01M 8/026* (2016.01)
*H01M 8/0265* (2016.01)
(Continued)

(52) U.S. Cl.
CPC ......... *H01M 8/026* (2013.01); *H01M 8/0254* (2013.01); *H01M 8/0256* (2013.01);
(Continued)

(58) Field of Classification Search
None
See application file for complete search history.

(56) References Cited

U.S. PATENT DOCUMENTS

| 9,065,090 B2 | 6/2015 | Kawajiri et al. |
| 2010/0104912 A1 | 4/2010 | Ogawa et al. |

(Continued)

FOREIGN PATENT DOCUMENTS

| JP | 2005135763 A | 5/2005 |
| JP | 2009-264901 A | 11/2009 |

(Continued)

OTHER PUBLICATIONS

Extended European Search Report for application No. 16182066.7, dated Oct. 5, 2016 (7 pgs).
Japanese Office Action for Application No. 2015-163694, dated Aug. 30, 2018 (2 pgs) (English language machine translation—3 pgs) (5 pgs total).

*Primary Examiner* — Wojciech Haske
(74) *Attorney, Agent, or Firm* — Patterson Thuente Pedersen, P.A.

(57) ABSTRACT

A gas channel forming plate includes protrusions, which extend parallel with each other, gas channels that are respectively located between each adjacent pair of the protrusions, and water channels, which are respectively formed on the back surface of each protrusion. Each protrusion includes first communication portions and second communication portions. Each first communication portion includes a first opening. Each second communication portion includes a second opening. The second communication portions of each protrusion constitute an expanding region, in which the opening area of the second opening in each second communication portion is greater than the opening area of the first opening of each first communication portion, to limit introduction of water to the water channel on the back side of the protrusion using capillary action by the second communication portions.

5 Claims, 7 Drawing Sheets

(51) Int. Cl.
  *H01M 8/0254* (2016.01)
  *H01M 8/04119* (2016.01)
  *H01M 8/2457* (2016.01)
  *H01M 8/0256* (2016.01)
  *H01M 8/241* (2016.01)
  *H01M 8/0206* (2016.01)
  *H01M 8/021* (2016.01)
  *H01M 8/1018* (2016.01)

(52) U.S. Cl.
  CPC ..... *H01M 8/0265* (2013.01); *H01M 8/04156* (2013.01); *H01M 8/241* (2013.01); *H01M 8/2457* (2016.02); *H01M 8/021* (2013.01); *H01M 8/0206* (2013.01); *H01M 2008/1095* (2013.01)

(56) References Cited

U.S. PATENT DOCUMENTS

2012/0301810 A1  11/2012  Kawajiri et al.
2015/0221958 A1   8/2015  Hashimoto et al.
2015/0236368 A1   8/2015  Hashimoto et al.
2016/0043412 A1   2/2016  Hashimoto et al.

FOREIGN PATENT DOCUMENTS

| | | | |
|---|---|---|---|
| JP | 2011-018605 A | 1/2011 | |
| JP | 2011150801 A | 8/2011 | |
| JP | 2014167860 A | 9/2014 | |
| JP | 2015015218 A | 1/2015 | |
| WO | WO 2014132707 A1 * | 9/2014 | .......... H01M 8/0258 |

* cited by examiner

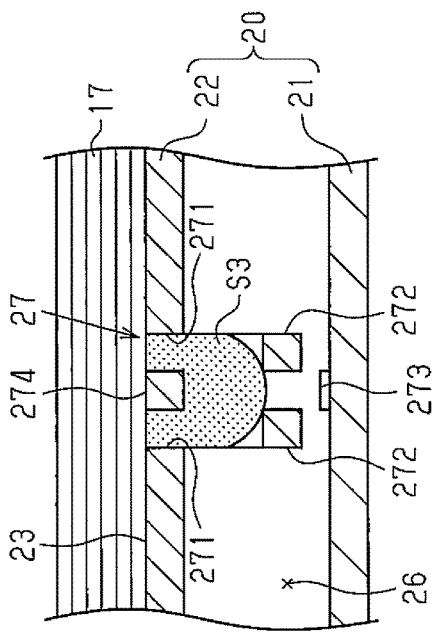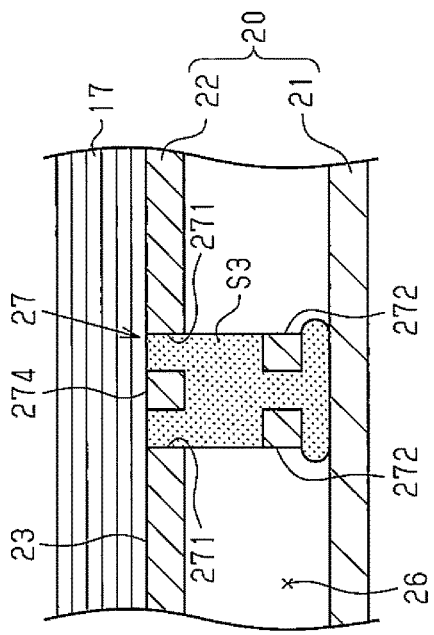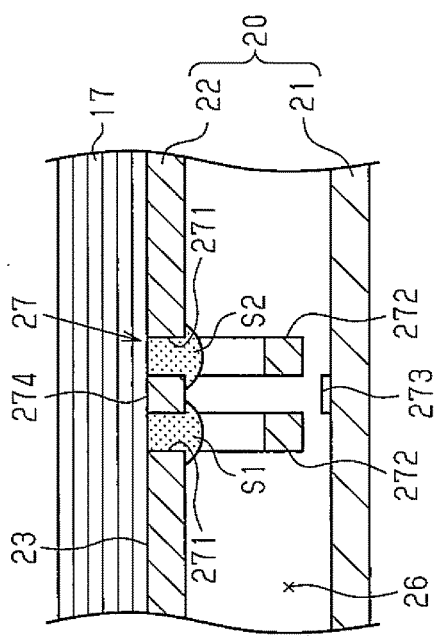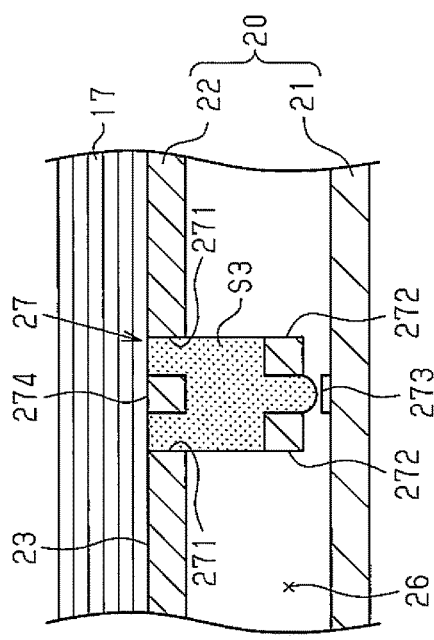

GAS CHANNEL FORMING PLATE FOR FUEL CELL AND FUEL CELL STACK

RELATED APPLICATION

The present application claims priority to Japanese Application No. 2015-163694, filed Aug. 21, 2015, which is hereby incorporated herein in its entirety by reference.

BACKGROUND OF THE INVENTION

The present invention relates to a gas channel forming plate that is arranged between a membrane electrode assembly and a plate-shaped flat separator and constitutes a separator of a single cell in a fuel cell, and to a fuel cell stack formed by stacking single cells.

For example, a solid polymer fuel cell includes a fuel cell stack, which is formed by stacking single cells. Each single cell includes a membrane electrode assembly and a pair of separators. The membrane electrode assembly is placed between the separators.

As such a separator, there is a separator including a plate-shaped flat separator and a gas channel forming plate that is arranged between a membrane electrode assembly and the flat separator (for example, refer to Japanese Laid-Open Patent Publication No. 2015-15218).

Grooves that extend parallel with each other are formed on a surface of the gas channel forming plate that faces the membrane electrode assembly. The grooves constitute gas channels, through which fuel gas or oxidant gas flows. The gas channel forming plate includes protrusions that are each formed between the corresponding adjacent pair of gas channels. In addition, grooves are formed on the back surfaces of the protrusions. The grooves constitute water channels for discharging water produced during power generation. The projections include communication passages through which the gas channels communicate with water channels and water in the gas channels is introduced to the water channels using capillary action.

In the fuel cell stack, water produced during power generation in the membrane electrode assembly flows out to the gas channels of the gas channel forming plate and is introduced to the water channels through the communication passages. The water is then discharged to the exterior of the water channels by the flow pressure of fuel gas or oxidant gas (hereinafter, referred to as gas) that flows through the water channels.

In the fuel cell stack, dry gas is introduced into the gas channels. Thus, a portion of the membrane electrode assembly that is close to the entrances of the gas channels is easily dried. Especially, at a low load time at which a small amount of power is generated, the amount of water produced during power generation in the membrane electrode assembly decreases. Thus, the membrane electrode assembly is more easily dried. As a result, movement of protons via water is hampered in the membrane electrode assembly, and it becomes a cause of decrease in the power generation performance.

SUMMARY OF THE INVENTION

It is an objective of the present invention to provide a gas channel forming plate for a fuel cell and a fuel cell stack that reduce water staying in the gas channels, while limiting decrease in the power generation performance caused by the dry membrane electrode assembly.

To achieve the objective, a gas channel forming plate for a fuel cell is arranged between a membrane electrode assembly and a plate-shaped flat separator to constitute a separator of a single cell of a fuel cell. Fuel gas and oxidant gas are supplied to the membrane electrode assembly to generate power and produce water. The gas channel forming plate includes a surface that faces the membrane electrode assembly, a plurality of protrusions that is formed on the surface and extends parallel with each other in an extending direction, a plurality of groove-shaped gas channels, each of which is located between an adjacent pair of the protrusions, and a plurality of groove-shaped water channels, each of which is formed on a back surface of one of the protrusions. One of the fuel gas and the oxidant gas flows into the membrane electrode assembly through the gas channels, and the water produced during power generation in the membrane electrode assembly flows out to the gas channels. Each protrusion includes a plurality of communication portions, which is formed to be separated from each other in the extending direction. The communication portions of each protrusion are configured to allow at least one gas channel adjacent to the protrusion to communicate with a water channel on a back side of the protrusion and to introduce water in the at least one gas channel adjacent to the protrusion to the water channel on the back side of the protrusion using capillary action. The communication portions include a plurality of first communication portions and a plurality of second communication portions, which is located upstream of the first communication portions in a flowing direction of gas. Each first communication portion includes a first opening, which opens in the surface that faces the membrane electrode assembly. Each second communication portion includes a second opening, which opens in the surface that faces the membrane electrode assembly. The second communication portions of each protrusion constitute an expanding region, in which an opening area of the second opening in each second communication portion is greater than an opening area of the first opening of each first communication portion, to limit introduction of water to the water channel on the back side of the protrusion using capillary action by the second communication portions.

BRIEF DESCRIPTION OF THE DRAWINGS

FIGS. 9A to 9D are cross-sectional views corresponding to FIG. 6, illustrating operation of the embodiment.

DETAILED DESCRIPTION OF THE PREFERRED EMBODIMENTS

With reference to FIGS. 1 to 9D, one embodiment will now be described.

Figure 1:
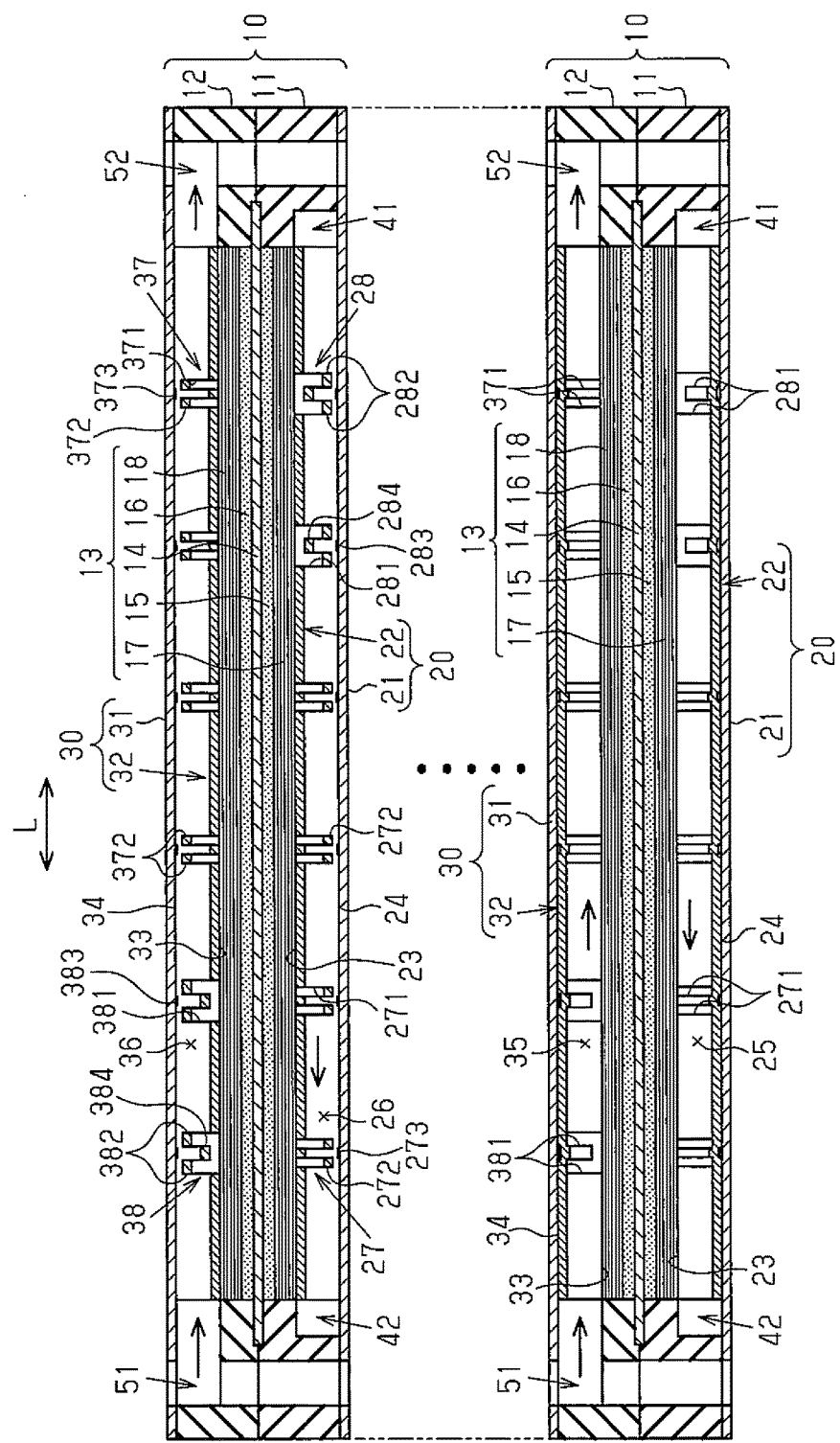
FIG. 1 is a cross-sectional view of a gas channel forming plate for a fuel cell and a fuel cell stack according to one embodiment.

As shown in FIG. 1, a solid polymer electrolyte fuel cell includes a fuel cell stack formed by stacking single cells 10. The single cell 10 on the upper side in FIG. 1 has a cross-section taken along such a line that first and second water channels 26 and 36, which will be described later, are visible while the single cell 10 on the lower side has a cross-section taken along such a line that first and second gas channels 25 and 35, which will be described later, are visible.

Each single cell 10 includes a rectangular first frame 11 and second frame 12. The first and second frames 11 and 12 hold the outer edge of a rectangular sheet-shaped membrane electrode assembly 13 of a known type in between.

The membrane electrode assembly 13 includes a solid polymer electrolyte membrane 14. First and second electrode catalyst layers 15 and 16 of a known type hold the solid polymer electrolyte membrane 14 in between. First and second gas diffusion layers 17 and 18 of a known type are arranged on the surfaces of the first and second electrode catalyst layers 15 and 16, respectively.

A first separator 20 and a second separator 30 sandwich the membrane electrode assembly 13 from the cathode-side (the lower side of FIG. 1) and the anode-side (the upper side of FIG. 1), respectively.

The first separator 20 includes a plate-shaped first flat separator 21 and a first gas channel forming plate 22, which is arranged between the first flat separator 21 and the membrane electrode assembly 13.

The second separator 30 includes a plate-shaped second flat separator 31 and a second gas channel forming plate 32, which is arranged between the second flat separator 31 and the membrane electrode assembly 13.

The flat separators 21 and 31 and the gas channel forming plates 22 and 32 are each formed of a metal plate.

The first frame 11 and the first flat separator 21 define a first supply passage 41 for supplying oxidant gas from an oxidant gas supply source (not shown) to a first gas channel 25, which will be described later, and a first discharge passage 42 for discharging oxidant gas that has not been used for power generation to the exterior of the first gas channel 25.

The second frame 12 and the second flat separator 31 define a second supply passage 51 for supplying fuel gas from a fuel gas supply source (not shown) to a second gas channel 35, which will be described later, and a second discharge passage 52 for discharging fuel gas that has not been used for power generation to the exterior of the second gas channel 35.

In the portion shown in FIG. 1, the second gas channel forming plate 32 of the second separator 30 has a shape obtained by inverting the first gas channel forming plate 22 of the first separator 20 vertically and horizontally. Thus, hereinafter, the first gas channel forming plate 22 of the first separator 20 will be described, and the repetitive description of the second gas channel forming plate 32 of the second separator 30 will be omitted by giving reference numerals "3*", which are obtained by adding 10 to reference numerals "2*" of components of the first gas channel forming plate 22 of the first separator 20, to corresponding components of the second gas channel forming plate 32 of the second separator 30. In addition, the repetitive description will be omitted by giving reference numerals "37*" and "38*," which are obtained by adding 100 to reference numerals "27*" and "28*." The sign * indicates one of numbers from zero to nine.

The structure of the first gas channel forming plate 22 will now be described.

Figure 2:
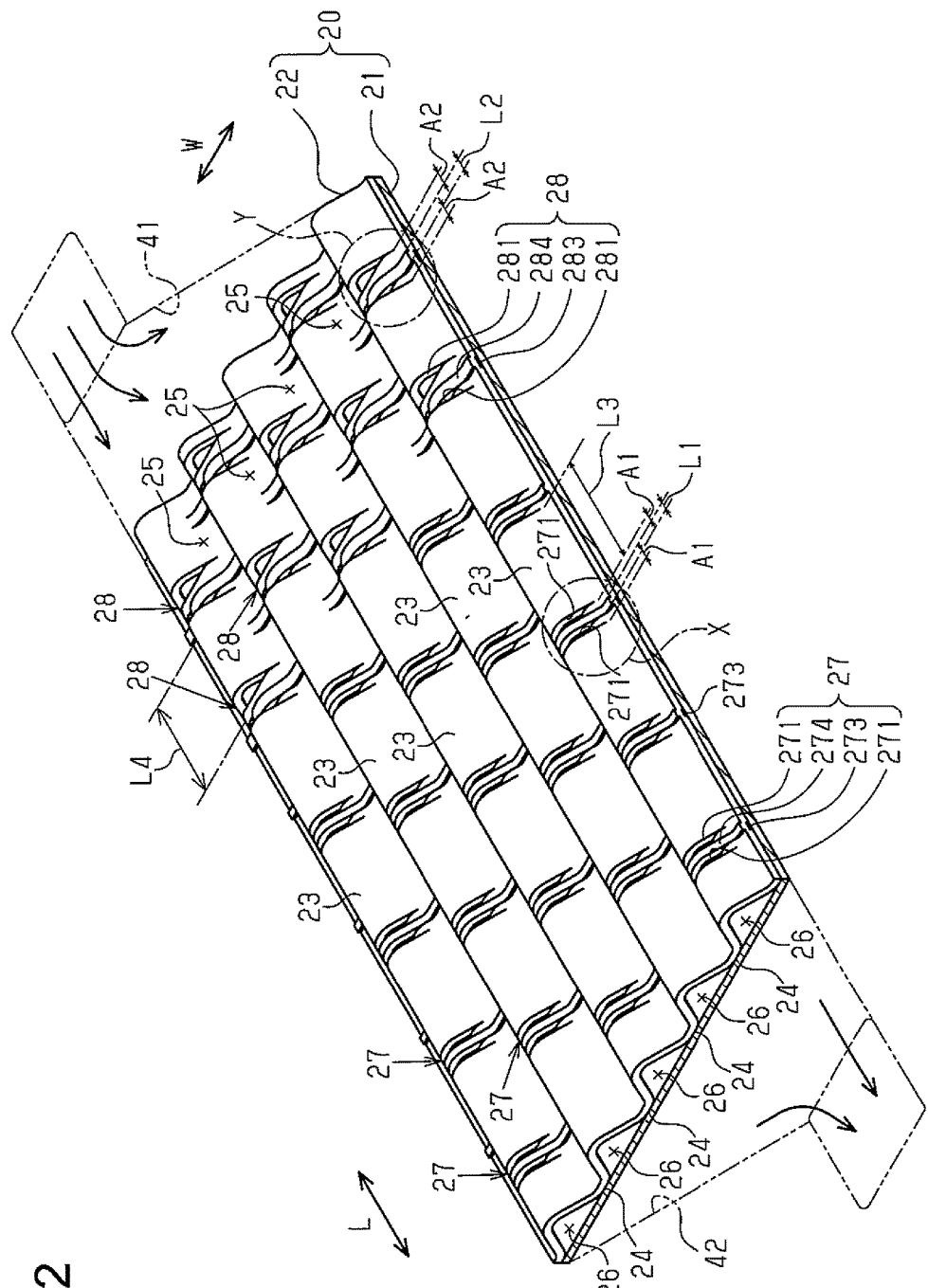
FIG. 2 is a perspective cross-sectional view of a first separator according to the embodiment.

As shown in FIG. 2, the first gas channel forming plate 22 has a corrugated cross section and is formed by, e.g., rolling one metal plate such as a stainless steel plate. Inner protrusions 23, which extend parallel with each other, are formed on the upper surface of the first gas channel forming plate 22, i.e., the surface of the first gas channel forming plate that faces the membrane electrode assembly 13. The top surfaces of the inner protrusions 23 are in contact with the membrane electrode assembly 13. A groove-shaped first gas channel 25, through which oxidant gas flows, is formed between each adjacent pair of inner protrusions 23.

Outer protrusions 24, which extend parallel with each other, are formed on the lower surface of the first gas channel forming plate 22. The top surfaces of the outer protrusions 24 are in contact with the flat separator 21. A groove-shaped first water channel 26 for discharging water produced during power generation in the membrane electrode assembly 13 is formed on the back surface of each inner protrusion 23. Thus, each outer protrusion 24 is located between the corresponding adjacent pair of first water channels 26 and defines the water channels 26.

Each inner protrusion 23 includes first and second communication portions 27 and 28, which allow the corresponding first gas channel 25 and first water channel 26 to communicate with each other, in the extending direction L of the inner protrusions 23.

Figure 3:
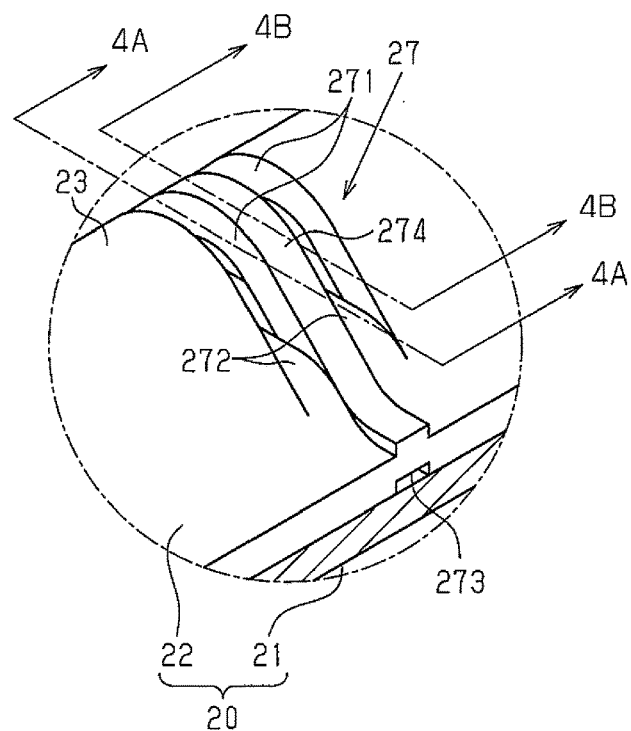
FIG. 3 is a perspective cross-sectional view of an expanded X portion of FIG. 2.
Figure 6:
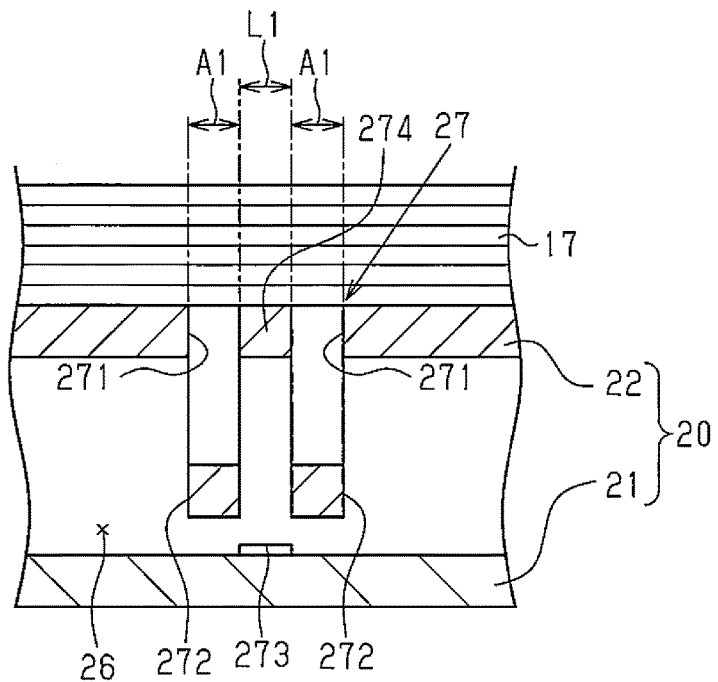
FIG. 6 is a cross-sectional view of the surrounding of a first communication portion according to the embodiment.

As shown in FIGS. 2, 3, and 6, the first communication portions 27 are located downstream of the second communication portions 28 in the flowing direction of gas. Each first communication portion 27 includes two first slits 271, which are formed at a predetermined interval L1 in the extending direction L of the inner protrusions 23. Each first slit 271 extends perpendicular to the extending direction L of the inner protrusions 23 and has a preset width A1. The width A1 of the first slit 271 is set to be the same measurement as the interval L1 between each adjacent pair of first slits 271 (L1=A1). The width A1 of each first slit 271 is set to have a measurement that allows water in the corresponding first gas channel 25 to be introduced to the corresponding first water channel 26 using capillary action.

Figure 4A:
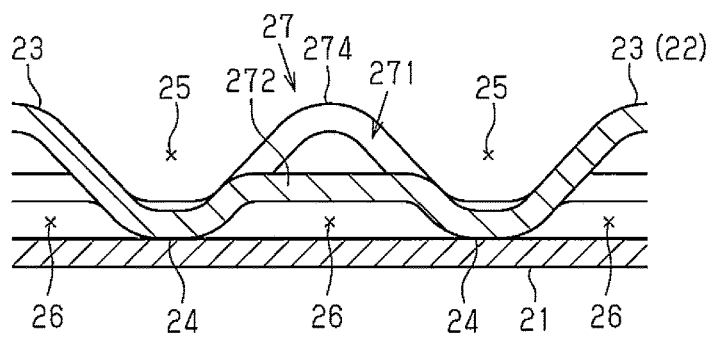
FIG. 4A is a partial cross-sectional view taken along line 4A-4A of FIG. 3.
Figure 4B:
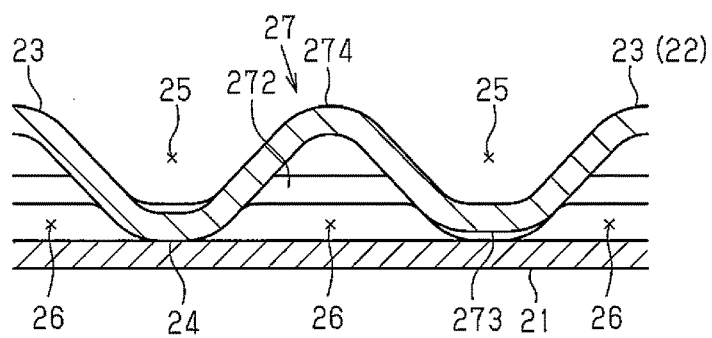
FIG. 4B is a partial cross-sectional view taken along line 4B-4B of FIG. 3.
Figure 5:
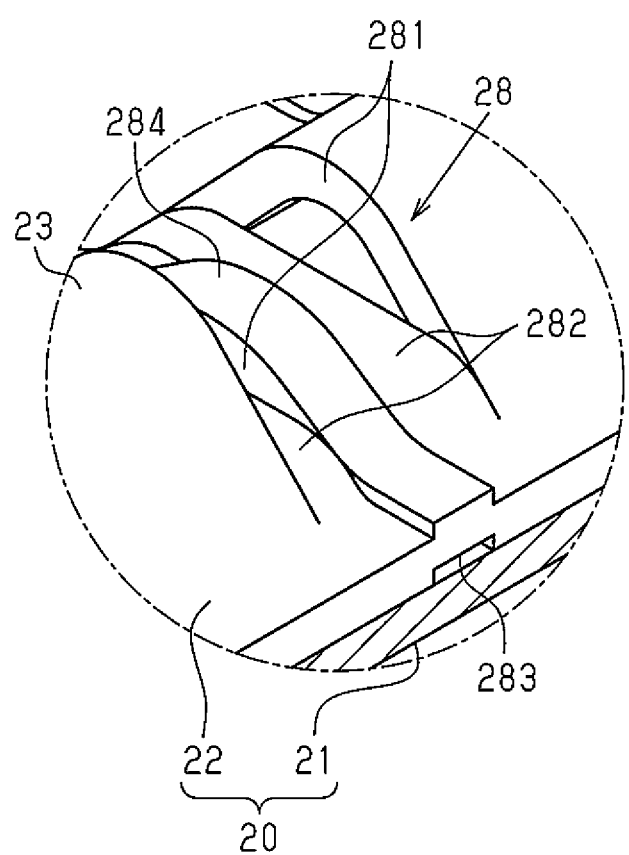
FIG. 5 is a perspective cross-sectional view of an expanded Y portion of FIG. 2.

As shown in FIGS. 2 to 4B, first ribs 272 (first intermediate structure portions), which face the first slits 271, are formed inside each first water channel 26. The first ribs 272 extend in the direction perpendicular to the extending direction L of the inner protrusions 23 (hereinafter, referred to as a width direction W). Each first rib 272 is formed by shear-bending a part of the corresponding inner protrusion 23 when a metal plate is rolled in the width direction W to form the first gas channel forming plate 22. In other words, each first slit 271 is formed by forming the corresponding first rib 272. As shown in FIG. 4A, each first rib 272 is located inside the corresponding first water channel 26. As shown in FIG. 4B, each outer protrusion 24 includes communication grooves 273, which allows the corresponding pair of first water channels 26 that is adjacent to each other via the outer protrusion 24 to communicate with each other.

As shown in FIG. 2, in each inner protrusion 23, the first communication portions 27 are formed at intervals L3 in the extending direction L of the inner protrusions 23. The interval L3 between each adjacent pair of first communication portions 27 is set to be greater than the interval L1 between each pair of first slits 271 of the first communication portions 27 (L3>L1). In addition, each first communication portion 27 of each inner protrusion 23 is located in the middle point between the corresponding adjacent pair of first communication portions 27 of an adjacent inner protrusion 23.

The second communication portions 28 are located upstream of the first communication portions 27 in the flowing direction of gas. Each second communication portion 28 includes a pair of second slits 281, which is formed at a predetermined interval L2, in the extending direction L of the inner protrusions 23.

Each second slit 281 extends perpendicular to the extending direction L of the inner protrusions 23 and has a preset width A2. The width A2 of each second slit 281 is set to be greater than width A1 of each first slit 271 of the first communication portions 27 (A2>A1). In other words, each first slit 271 constitutes a first opening that opens in the surface that faces the membrane electrode assembly 13 (the upper surface) in the corresponding first communication portion 27. Each second slit 281 constitutes a second opening that opens in the surface that faces the membrane electrode assembly 13 (the upper surface) in the corresponding second communication portion 28. The opening area of each second opening of the second communication portions 28 is expanded to be greater than the opening area of each first opening of the first communication portions 27. In other words, the second communication portions 28, which are located upstream in the flowing direction of gas, constitute an expanding region, in which the opening area of the second openings that open in the surface that faces the membrane electrode assembly 13 of each second communication portion 28 is greater than the opening area of the first openings of each first communication portion 27, which are located downstream in the flowing direction of gas. The width A2 of each second slit 281 is set to be the same measurement as the interval L2 between each pair of second slits 281 (L2=A2).

Second ribs 282 (second intermediate structure portions), which face the second slits 281, are formed inside each first water channel 26. The second ribs 282 are formed in a method similar to the first ribs 272 of the first communication portions 27.

A partition 284 between each pair of the second slits 281 that constitutes the corresponding second communication portion 28 in the corresponding inner protrusion 23 is located inside the corresponding first water channel 26.

In each inner protrusion 23, the second communication portions 28 are formed at a predetermined interval L4 in the extending direction L of the inner protrusions 23. The interval L4 of each adjacent pair of second communication portions 28 is set to be greater than the interval L2 between each pair of second slits 281 of the second communication portions 28 (L4>L2). In addition, each second communication portion 28 of each inner protrusion 23 is located in the middle point between the corresponding adjacent pair of second communication portions 28 of an adjacent inner protrusion 23.

The first and second ribs 272 and 282 of the first and second communication portions 27 and 28 are arranged closer to the top surfaces of the outer protrusions 24 than the top surfaces of the inner protrusions 23 in the thickness direction of the first gas channel forming plate 22 (the vertical direction of FIGS. 4A, 4B, 6, and 7). Even when the cross-sectional area of each first gas channel 25 and the cross-sectional area of each first water channel 26 at a location at which the first and second ribs 272 and 282 do not exist in the extending direction L are set to be the same as each other, the pressure loss in the entire first water channel 26 is greater than the pressure loss in the entire first gas channel 25 due to the first and second ribs 272 and 282. The shapes and sizes of the first and second slits 271 and 281 are set such that the pressure loss at the first and second slits 271 and 281 is greater than the pressure loss in the first gas channel 25. Therefore, oxidant gas mainly flows through the first gas channel 25 with smaller pressure loss.

Operation of the present embodiment will now be described.

As indicated by the single cell 10 on the lower side in FIG. 1, when fuel gas is supplied into each second gas channel 35 through the second supply passage 51, the fuel gas flows into the second gas diffusion layer 18 through the second gas channel 35. The fuel gas is then supplied to the second electrode catalyst layer 16 by passing through the second gas diffusion layer 18 and being diffused.

When oxidant gas is supplied into each first gas channel 25 through the first supply passage 41, the oxidant gas flows into the first gas diffusion layer 17 through the first gas channel 25. The oxidant gas is then supplied to the first electrode catalyst layer 15 by passing through the first gas diffusion layer 17 and being diffused.

In this way, when the fuel gas and the oxidant gas are each supplied to the membrane electrode assembly 13, power is generated by electrochemical reaction in the membrane electrode assembly 13.

At this time, water produced during power generation mainly flows out to the first gas channel 25 of the first gas channel forming plate 22 on the cathode-side.

Figure 8A:
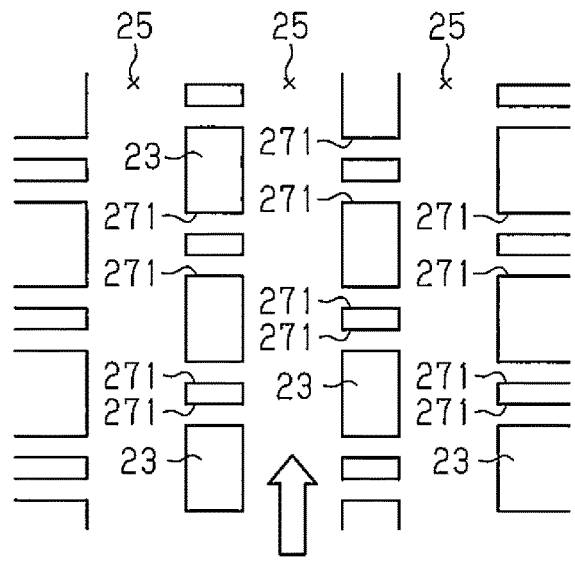
FIGS. 8A and 8B are schematic views of a first gas channel and a first communication passage.
Figure 8B:
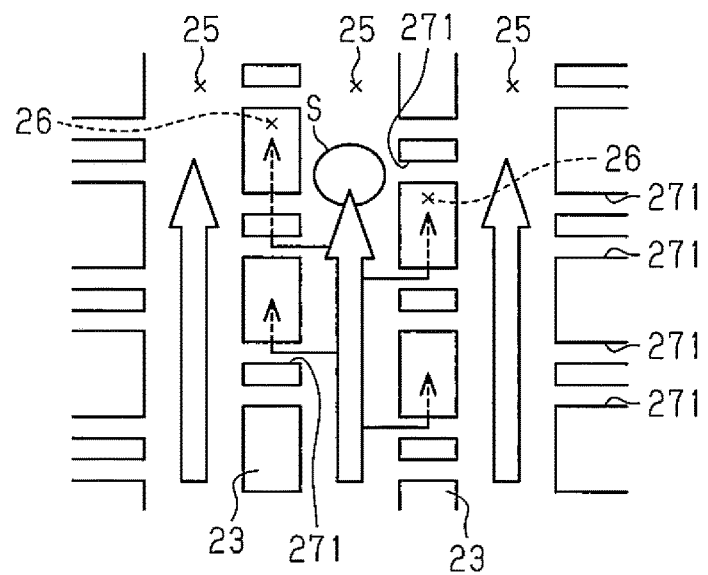

As indicated by white thick arrows in FIGS. 8A and 8B, some of the water produced during power generation flows in each first gas channel 25 by flow pressure of oxidant gas flowing through the first gas channel 25. The water is then discharged to the exterior through the first discharge passage 42 (refer to FIG. 1). As described above, the pressure loss at the slits 271 (281) is set to be greater than the pressure loss at the first gas channels 25. Thus, as shown in FIG. 8B, the oxidant gas mainly flows through the first gas channels 25. This causes most of the water that exists in the first gas channels 25 to move in the first gas channels 25 toward the first discharge passage 42 while being pushed by the oxidant gas. As indicated by thin arrows in FIG. 8B, some of the water is introduced to a first water channel 26 through the corresponding slits 271(281).

At this time, the water that has been introduced to the first water channel 26 becomes droplets by surface tension acting according to the opening area of the exit opening of the first water channel 26. When the first water channel 26 is in a moistening state and a droplet S stays at a rib 272, water in the first water channel 26 acts as priming water to guide the water in the corresponding first slits 271 into the first water channel 26 by capillary action and discharge the water through the exit opening.

When the first water channel 26 is in a dry state, in which no water that acts as priming water exists in the first water channel 26, as shown in FIG. 9A, water is guided into the first slits 271 by capillary action in the top surface of the corresponding inner protrusion 23, which is in contact with the first gas diffusion layer 17, and forms droplets S1 and S2.

When more water is guided to make the droplets S1 and S2 larger, as shown in FIG. 9B, the droplets S1 and S2 are merged to form one droplet S3. Immediately after the droplets S1 and S2 are merged to form the droplet S3, or the droplet S3 becomes larger, the droplet S3 contacts the first ribs 272. When the droplet S3 moves into the gap between the pair of first ribs 272 as shown in FIG. 9C, the droplet S3 is introduced into the first water channel 26 by being drawn into the gap by capillary action as shown in FIG. 9D.

When the flow velocity of the oxidant gas is low, water is gradually collected in the first water channel 26 by introducing the droplet S3 as described above.

When the flow velocity of the oxidant gas is high, water introduced to the first water channel 26 moves in the first water channel 26 toward the first discharge passage 42 (refer to FIG. 1) while being pushed by flow pressure of oxidant gas flowing in the first water channel 26.

As described above, in a fuel cell stack, dry oxidant gas is introduced into each first gas channel 25. Thus, a portion of the membrane electrode assembly 13 that is close to the entrance of the first gas channel 25 is likely to be dried. Especially, at a low load time, at which a small amount of power is generated, the amount of water produced during power generation in the membrane electrode assembly 13 is decreased. Thus, the membrane electrode assembly 13 is more likely to be dried.

In this respect, in the present embodiment, introduction of water to the first water channel 26 using capillary action by the second communication portions 28 is restrained by increasing the opening areas of the second communication portions 28 in the expanding region formed upstream in the flowing direction of gas. This limits drying of the upstream portion of the membrane electrode assembly 13, which is likely to be dried. Thus, the membrane electrode assembly 13 can be kept moist to promote movement of protons.

In a region downstream of the expanding region, water in the first gas channels 25 is effectively introduced to the respective first water channels 26 using capillary action by first communication portions 27. This restricts the flow of gas from being hampered by water staying in the first gas channels 25.

When the amount of water produced in the membrane electrode assembly 13 is increased, water in the first gas channels 25 is also introduced to the first water channels 26 using capillary action by the second communication portions 28 in the expanding region. This restricts the flow of gas from being hampered by water staying in the first gas channels 25.

Some of the water produced during power generation flows out to the second gas channels 35 of the second gas channel forming plate 32 through the second electrode catalyst layer 16 and the second gas diffusion layer 18 on the anode-side (the upper side of FIG. 1). In the present embodiment, the second gas channel forming plate 32 on the anode-side has basically the same configuration as the first gas channel forming plates 22 on the cathode-side. Thus, the second gas channels 35 and the second water channels 36 on the anode-side also provide the same operation as the first gas channels 25 and the first water channels 26 on the cathode-side.

The gas channel forming plate for a fuel cell and the fuel cell stack according to the present embodiment, which is described above, achieves the following advantages.

(1) The inner protrusions 23, which extend parallel with each other, are formed on the upper surface of the first gas channel forming plate 22, i.e., a surface that faces the membrane electrode assembly 13 in the first gas channel forming plate. Each inner protrusion 23 includes the first communication portions 27 and the second communication portions 28, which are located upstream of the first communication portions 27 in the flowing direction of gas. Each first communication portion 27 includes the first slits 271. Each first slit 271 constitutes the first opening, which opens in the surface that faces the membrane electrode assembly 13. Each second communication portion 28 includes the second slits 281. Each second slit 281 constitutes the second opening, which opens in the surface that faces the membrane electrode assembly 13. In each inner protrusion 23, the second communication portions 28 constitute the expanding region, in which the opening area of the second openings of each second communication portion 28 is larger than the opening area of the first openings of each first communication portion 27. This limits introduction of water to the first water channels 26 on the back sides of the inner protrusions 23 using capillary action by the second communication portions 28.

Such a configuration limits drying of an upstream portion of the membrane electrode assembly 13, which is easily dried. This allows the membrane electrode assembly 13 to be kept moist, and the movement of protons is promoted.

In a region downstream of the expanding region that consists of the second communication portions 28, water in the first gas channel 25 is effectively introduced to the first water channel 26 using capillary action by the first communication portions 27. When the amount of water produced in the membrane electrode assembly 13 is increased, water in the first gas channel 25 is also introduced to the first water channel 26 in the expanding region using capillary action by the second communication portions 28. This restricts the flow of gas from being hampered by water staying in the first gas channel 25.

Therefore, a decrease in the power generation performance caused by the dry membrane electrode assembly 13 is limited while water staying in the first gas channel 25 is reduced.

(2) The width A2 of each second slit 281, which constitutes a second opening of the corresponding second communication portion 28, is set to be greater than the width A1 of each first slit 271 of the first communication portions 27, which are located downstream of the expanding region (A2>A1).

Such a configuration allows the opening area of the second opening of the second communication portion 28 to be easily expanded by setting the width A2 of the second slit 281 wide.

(3) Each inner protrusion 23 includes the corresponding partitions 284, which are formed between the respective pairs of second slits 281 of the corresponding second communication portions 28. The partitions 284 are located inside the corresponding water channel 26 on the back side of the inner protrusion 23.

In each second communication portion 28 of each inner protrusion 23, the second openings of the pair of second slits 281 are connected to each other by locating the partition 284 between the pair of second slits 281 inside the corresponding water channel 26. This increases the opening area of the second communication portion 28, allowing the opening area to be easily expanded to be larger than the area of the first openings of each first communication portion 27. Accordingly, the configuration allows the opening area of the second communication portion 28 to be increased without increasing the widths of the second slits 281 so much.

MODIFICATIONS

The above-illustrated embodiment may be modified in the following forms.

The first and second gas channel forming plates 22 and 32 may be formed of a metal plate other than a stainless plate such as a titanium plate.

Figure 7:
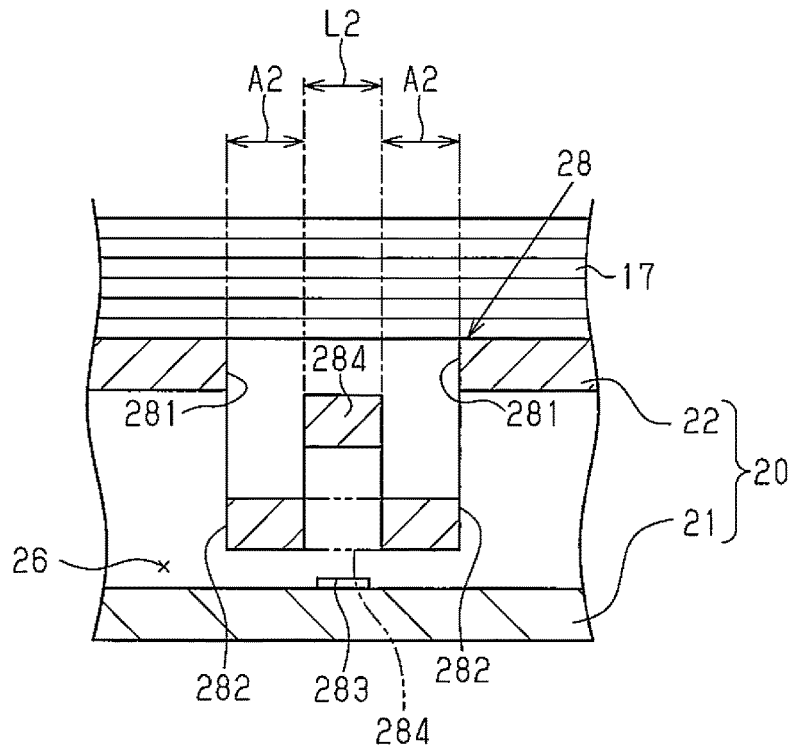
FIG. 7 is a cross-sectional view of the surrounding of a second communication portion according to the embodiment.

For example, as indicated by long dashed two short dashed lines in FIG. 7, the partition 284 of each second communication portion 28 may be formed to be the same height as the second ribs 282. In other words, the partition 284 and the second ribs 282 may be integrated.

In the above-illustrated embodiment, each partition 284 of the second communication portions 28 does not necessarily need to be located in the corresponding first water channel 26. The partition 284 may be formed to have the same height as the top surface of the corresponding inner protrusion 23. This modification also allows the opening area of the second openings, which open in the surface that faces the membrane electrode assembly 13, to be increased by setting the width A2 of each second slit 281 larger than the width A1 of each first slit 271 of the first communication portions 27.

In the above-illustrated embodiment, the width A2 of each second slit 281 of the second communication portions 28 may be set to be the same as the width A1 of each first slit 271 of the first communication portions 27. Even in this case, the second openings of each pair of second slits 281 are connected to each other to increase the opening area of the corresponding second communication portion 28 by locating the corresponding partition 284 inside the corresponding first water channel 26.

The number of slits that constitute a communication portion is not limited to two. In other words, one slit may constitute a communication portion, or three or more slits may constitute a communication portion.

The first and second ribs 272 and 282 (first and second intermediate structure portions) may be omitted. The first and second ribs 372 and 382 (first and second intermediate structure portions) may be omitted.

In the above-illustrated embodiment, the first and second gas channel forming plates 22 and 32 having expanding regions (second communication portions 28 and 38) are arranged on both the cathode-side and the anode-side of the membrane electrode assembly 13. Instead of this, a gas channel forming plate with an expanding region may be arranged only on the cathode-side of the membrane electrode assembly 13, and a gas channel forming plate without an expanding region may be arranged on the anode-side.

Alternatively, a gas channel forming plate with an expanding region may be arranged only on the anode-side of the membrane electrode assembly 13, and a gas channel forming plate without an expanding region may be arranged on the cathode-side.

The invention claimed is:

1. A gas channel forming plate for a fuel cell, which is arranged between a membrane electrode assembly and a plate-shaped flat separator to constitute a separator of a single cell of a fuel cell, wherein fuel gas and oxidant gas are supplied to the membrane electrode assembly to generate power and produce water, the gas channel forming plate comprising:
    a surface that faces the membrane electrode assembly;
    a plurality of protrusions that is formed on the surface and extends parallel with each other in an extending direction;
    a plurality of groove-shaped gas channels, each of which is located between an adjacent pair of the protrusions, wherein one of the fuel gas and the oxidant gas flows into the membrane electrode assembly through the gas channels, and the water produced during power generation in the membrane electrode assembly flows out to the gas channels; and
    a plurality of groove-shaped water channels, each of which is formed on a back surface of one of the protrusions, wherein each protrusion includes a plurality of communication portions, which is formed to be separated from each other in the extending direction, the communication portions of each protrusion are configured to allow at least one gas channel adjacent to the protrusion to communicate with a water channel on a back side of the protrusion and to introduce water in the at least one gas channel adjacent to the protrusion to the water channel on the back side of the protrusion using capillary action, the communication portions of each protrusion include a plurality of first communication portions and a plurality of second communication portions, each of the second communication portions being located upstream of all the first communication portions in a flowing direction of gas, each first communication portion includes a first opening, which opens in the surface that faces the membrane electrode assembly, each second communication portion includes a second opening, which opens in the surface that faces the membrane electrode assembly, and the second communication portions of each protrusion constitute an expanding region, in which an opening area of the second opening in each second communication portion is greater than an opening area of the first opening of each first communication portion, to limit introduction of water to the water channel on the back side of the protrusion using capillary action by the second communication portions.

2. The gas channel forming plate for a fuel cell according to claim 1, wherein each first communication portion includes a first slit, which extends perpendicular to the extending direction, has a predetermined width, and constitutes the first opening of the first communication portion, and a first intermediate structure portion, which is located inside the corresponding water channel and faces the first slit, and each second communication portion includes a second slit, which extends perpendicular to the extending direction, has a predetermined width, and constitutes the second opening of the second communication portion, and a second intermediate structure portion, which is located inside the corresponding water channel and faces the second slit.

3. The gas channel forming plate for a fuel cell according to claim 2, wherein the predetermined width of the second slit is set to be greater than the predetermined width of the first slit.

4. The gas channel forming plate for a fuel cell according to claim 2, wherein the first slit of each first communication portion is one of at least two first slits, which are formed at a predetermined interval in the extending direction, the second slit of each second communication portion is one of at least two second slits, which are formed at a predetermined interval in the extending direction, the predetermined interval of each adjacent pair of the first slits in the extending direction is set to be less than an interval of each adjacent pair of the first communication portions in the extending direction, the predetermined interval of each adjacent pair of the second slits in the extending direction is set to be less than an interval of each adjacent pair of the second communication portions in the extending direction, each protrusion includes a plurality of partitions, which is respectively formed between each adjacent pair of the second slits in the extending direction in each second communication portion, and the partitions are located inside the water channel on the back side of the protrusion.

5. A fuel cell stack formed by stacking a plurality of single cells, wherein each of the single cells includes a membrane electrode assembly and two separators, between which the membrane electrode assembly is placed, and one of the separators includes the flat separator and the gas channel forming plate for a fuel cell according to claim 1, the gas channel forming plate being arranged between the membrane electrode assembly and the flat separator.

\* \* \* \* \*